(12) United States Patent  
Hatami-Hanza

(10) Patent No.: US 10,095,985 B2  
(45) Date of Patent: Oct. 9, 2018

(54) ASSISTED KNOWLEDGE DISCOVERY AND PUBLICATION SYSTEM AND METHOD

(71) Applicant: Hamid Hatami-Hanza, Thornhill (CA)

(72) Inventor: Hamid Hatami-Hanza, Thornhill (CA)

(73) Assignee: Hamid Hatami-Hanza, Thornhill, Ontario (CA)

( * ) Notice: Subject to any disclaimer, the term of this patent is extended or adjusted under 35 U.S.C. 154(b) by 265 days.

(21) Appl. No.: 14/684,393

(22) Filed: Apr. 12, 2015

(65) Prior Publication Data

US 2015/0220852 A1    Aug. 6, 2015

Related U.S. Application Data

(63) Continuation-in-part of application No. 12/179,363, filed on Jul. 24, 2008.

(51) Int. Cl.
| | |
|---|---|
| *G06Q 10/10* | (2012.01) |
| *G06N 99/00* | (2010.01) |
| *G06F 17/30* | (2006.01) |
| *G06Q 30/02* | (2012.01) |
| *G06F 17/21* | (2006.01) |
| *H04L 29/06* | (2006.01) |

(52) U.S. Cl.
CPC ..... *G06N 99/005* (2013.01); *G06F 17/30613* (2013.01); *G06Q 10/10* (2013.01); *G06Q 30/0207* (2013.01)

(58) Field of Classification Search
USPC ....................................... 705/14.23; 715/234
See application file for complete search history.

(56) References Cited

U.S. PATENT DOCUMENTS

| | | | |
|---|---|---|---|
| 7,257,767 B1 * | 8/2007 | Carden, Jr. ......... | G06F 17/2264 707/999.009 |
| 2006/0031217 A1 * | 2/2006 | Smith ................ | G06K 9/00711 |
| 2006/0116926 A1 * | 6/2006 | Chen ..................... | G06Q 30/02 705/14.23 |

* cited by examiner

*Primary Examiner* — Scott A Zare  
*Assistant Examiner* — Reva R Danzig

(57) ABSTRACT

A system and method is presented for knowledge discovery that incorporate both human and computers to index, process, and communicate and share the knowledge and electronic contents. It also provides a platform for launching unlimited number of qualified and content reviewed publishing/broadcasting ventures or artificial beings. The system assists individuals for faster and more efficient discovery/creation of new and useful knowledge, and valuable artistic content. It also provides incentives to the owners of the ventures and a method for rewarding or compensating all contributors.

11 Claims, 13 Drawing Sheets

ASSISTED KNOWLEDGE DISCOVERY AND PUBLICATION SYSTEM AND METHOD

CROSS REFERENCED TO RELATED FOREIGN PATENT APPLICATION

The present application is a continuation in part of and claims the benefits of U.S. patent application Ser. No. 12/179,363 filed on Jul. 24, 2008 which claims priority from the Canadian patent application No. CA 2,595,541, filed on Jul. 26, 2007 entitled "ASSISTED KNOWLEDGE DISCOVERY AND PUBLICATION SYSTEM AND METHOD" which are incorporated entirely as references in this application.

FIELD OF INVENTION

This invention generally relates to knowledge discovery, content creation, and content sharing using people, computer systems, artificial beings, software program agents, and databases.

BACKGROUND OF THE INVENTION

Internet has provided a long awaiting tool for connection and communication of people around the world. One of the most important applications and implication of Internet is its use in enhancing ideas and rapid information exchange between people or groups of people with similar interests. Such growing interest has created many applications and systems for group discussions and question answering, such as Yahoo ask, wikipedia, search engines, photo and video sharing, numerous portals, discussion groups, and the like. These systems and applications have accelerated knowledge discovery, creation of artistic contents, producing novel and useful inventions, and in general advancement of our understanding of the universe around us.

SUMMARY OF THE INVENTION

Most of the knowledge sharing and contributions, on or over the Internet, are arbitrary qualified, it takes time for general public to come to a robust and lasting understanding of a subject, or appreciation of a content. Therefore, the vast amount of data, that is being generated daily, has to be filtered out over a relatively long period of time by collective wisdom of public before it can be used.

While in most subject matters of general public interest, ordinary people may contribute to the subject and let the fact and best solution to be found overtime, these unsupervised method of general public understanding growth lacks the rigor and credibility that is needed for a real advancement of public well being. The rigor and credibility only comes after a relatively long period of time. Mostly the information available through Internet needs further verification and research by the consumer and this could be time consuming and frustrating.

The process of peer reviewed scientific contribution publication, on the other hand, has the rigor and substance and therefore the credibility that is needed for true advancement of human knowledge, nevertheless it is a very slow process and does not present the speed and ease of accessibility that is necessary to tap into the vast potential of general public brain power and knowledge. Editors and reviewers of scientific journals do not have much incentive to serve unknown ordinary contributors. Moreover, naturally, they do not have the resources or expertise to find and cover all the subject matters of importance and assess and investigate all submitted contents.

Therefore there is a need in the art to have a system that, automatically or semi-automatically, can assist both publication/broadcasting administration and contributors to screen and assess all submitted contents in terms of their intrinsic value and substance before being viewed or used by public, without posing the above mentioned constraints. It is also desirable to have a system that can systematically guide users, through their research to discover, innovate, create, and make valuable contributions. It is also advantageous to have a central system that allow all the qualified experts launch their own publication/broadcasting ventures with the least amount of investment and overhead for commercial gain thereby accelerating the rate of knowledge discovery, knowledge distillation, and economic growth.

In this application a system and method is presented for knowledge sharing and discovery by analyzing the content of online repositories, building an association database of ontological subjects, and solicitation of electronic contents in the form of a text, audio, or video and any combination of them. The system and method can assist and guide the users and creators, regardless of their level of knowledge, to being able to make valuable contributions, while shortening the research and creation time significantly. The shared knowledge is peer reviewed by authorities in each subject so that their quality and substance is more reliable than arbitrary qualified contents presently available in the Internet.

The system is comprised of information processing units in the form of hardware and software that are connected to the Internet by communication means. The processing units can be comprised of electronic hardware such as CPUs (central processing units) memories, and software in the form of specialized programs and algorithms, and intelligent agent program, in any applicable computer language.

The processing units or processing devices (e.g. CPUs) must be able to handle large collections of data. Therefore the computing units, or data processing devices, to implement the system have compound processing speed equivalent of one thousand million or larger than one thousand million instructions per second and a collective memory, or storage devices (e.g. RAM), that is able to store large enough chunks of data to enable the system to carry out the task and decrease the processing time significantly compared to a single generic personal computer available at the time of the present disclosure."

It is also very desirable to enable a data processing system, such as a computer system comprise of data processing or computing devices/units, data storage units/devices, and/or environmental data acquisitions units/devices, and/or data communication units/devices, and/or input/output units/devices, and/or limbs, to learn as much information and gain knowledge/data by processing compositions of data of various forms and/or become able to produce new knowledge and useful data or compositions of data and/or autonomous decision making according to some codes of conducts. Such an enabled machine would be of an immense assistance to the development of human civilization much further and much faster leading to abundance, economic prosperity, biological and mental health, and well-being of society.

Accordingly and, for instances, in applications such as question answering, knowledge retrieval, or machine learning from a knowledge database or knowledge repositories or data warehouses or streams, one need to know what are there to know at first and then looking for how they are related in order to build and enrich the knowledge base that is able to serve a client satisfactorily. Currently, for instance, there is no systematic way of building such a database or general ontology consisting of statements of verified facts. The few attempts to build such useful databases are based on human labor or complicated reasoning and first order logic framework, rather than a systematic and automatic way of finding the distilled knowledge from the vast repositories of human generated data available over the internet or other data warehouses.

In building the system software agents are used to find important subject matters/fields of interest by looking up into a list of subjects gathered from various sources such as lexicons, ontologies, dictionaries, special dictionaries, and searching through Internet and counting and ranking the importance of a subject by counting the number of documents containing that subject or any other ranking methods for concepts. At the same time the software agent is looking for proper names and affiliations and addresses that are associated with the subject and ranking them accordingly based on their level of authority. Alternatively the system finds the subjects of importance and interests and the associated experts by directly searching through readily available databases where it can find the desired information such as university URLS, specialized professional associations, who's who, and all online publication collections available.

The system then assigns appropriate names or titles for such subject matters and makes a list of available subjects and titles as candidate name for publication/broadcasting shop to be used for subscription and running by users. In the preferred embodiment, the system further provides an online publishing/broadcasting format/s for each subject matter in the form of online journals or knowledge sharing groups, interactive conferences, broadcasting templates and the like, which is called a publishing/broadcasting shop in this application. The system further contains a database of authorities' experts in each subject matter for consultation and reviewing.

Users, who want to establish their own online publishing/broadcasting shop, then may apply to subscribe or buy online publishing/broadcasting shop's title/s among the topics and titles available. Alternatively the system accepts suggestion from interested users or subscriber to open a shop with their own suggested title or name. Interested users can include individuals, legal entities, a group of individuals as well as computer agents. The system will grant the privilege of establishing an online publication/broadcasting shop according to the system's predetermined standards. Once the application is approved and a title of publishing/broadcasting shop is assigned to the user the owner of the online shop can use the service of the system and start soliciting and providing the service to her/his group of people interested in that subject matter.

To assist the editors and contributors, reviewers, and users, the system has a distilled universal repository of human knowledge that is called Ontological Subject Map (OSM) in this application. The OSM is used to screen, evaluate, guide and assist, and measure the value of a submitted content, its novelty, and overall merit of a contribution. By consulting the OSM the system can pose useful questions and make intelligent suggestions and guides for further research or clarification.

The OSM is a layered indexed repository of universal knowledge that is built by indexing all related existing concepts and subjects, nouns, proper nouns, compound nouns, named entities or in general all such conceivable entities and concepts, that we call Ontological Subjects (OS) in this invention. The layered index or database is built by starting from one or a number of most popular ontological subjects and searching the available databases to find all other ontological subjects associated with each of them ordered by their association ranks (e.g. counts.) Then each ontological subject is indexed with a desired number of other ontological subjects in each layer ordered by their association ranking. Once this layer is constructed and indexed we repeat the procedure to find the most related OSs with each member of this layer. A node in an open 2-dimensional tree like graph may represent each OS. Each node therefore can only be connected to its above OS node and a number of other nodes below it. In each layer there are two types of nodes, namely Dormant or Non-Dormant (growing). In each layer a node is dormant if the corresponding OS is already been growing in upper layer/s or the same layer. In a situation and according to one exemplary embodiment, if more than one OS is found associated with several upper nodes, and it is not growing in an upper layer, then it will become Non-Dormant only under a single node which has the highest ranking association to its immediately above node. In this manner each ontological subject is growing only once in the whole index. Therefore each non-dormant node is connected to one node above and is connected to a number of nodes below it. Dormant nodes are only connected to its immediately above node. If desired number of associated OS was not found for a node, then we add extra nodes and mark them as unknown. The desired number of associated OS for each node can be arbitrarily selected. However, for simplicity we may choose a constant number of associations for each node.

Furthermore we may consequently represent an OS with a discrete spectral like function whose horizontal axis is the associated OSs and the vertical axis is the value of each associate. In this way an Association Value (AV) function is defined and stored in the database for each OS for further usage. The associated OSs are considered here the ones that have co-occurred with said OS in some content. Those who co-occurred most then have higher association value to said OS. Also with two associate OSs, having similar co-occurrences with said OS, the one which is itself more valuable (e.g. has higher or lower frequency of occurrences) then can be even more valuable to said OS. The value of each associates of an OS (e.g. value of an association value function) is based on how often it has co-occurred with the OS and the importance of the associate. In other word the association value function of an OS is a function of its co-occurrence with other ontological subjects and the importance (according to some measure of importance) of the other ontological subjects that co-occurred with. The association value (AV) function can be considered a signature spectrum of an OS. Using signal-processing techniques, such as cross correlation, autocorrelation, Fourier Transformation (FT), Discreet Fourier Transformation (DFT) one then is able to extract the information and find a hidden relationship between OSs. For instance, using the concept of power spectral density, one may define and measure the power of an OS as a sign of its importance or for approximate reasoning application etc.

At the same time or after the indexing of OS association is completed, another software agent will look for the kind of associations between each OS and it's associates by searching through databases such as WordNet, FrameNet, the whole internet, or any such a database that a relation between an OS and its components is expressed by natural languages. The agent will look for patterns of explicitly expressed statements or semantic frames, as defined by FrameNet project in Berkeley University, to establish the kind of relationship between each two OSs. The agent may also use natural language processing (NLP) methods and algorithms such as text simplification, to find such an association pattern. However since there is a vast amount of data available, the chances are that the agent will be able to find the explicitly expressed and verified statement or frame, which is composed by humans, that is looking for. The verification of relations is done by statistical analysis of the database. Diversity of sources and a number of times that a statement is repeated to express a relation between two OS leads to the verification of that statement. These statements, or semantic frames, expressing a relationship between an OS and its components are also stored and indexed for further reference.

This database is then used to assess textual documents or any electronic content, such as audio or video, pictures, graphs, curves etc., that its information is transferred to textual format. The system first extracts the ontological subjects of a document and forms an OS spectrum or associated set for the document, with predetermined weighting coefficients rules. In one simple aspect of the invention, the system then can select an OS as the principal OS of the document and compare the document spectrum with that of the principal OS spectrum stored in the database, for further analysis. Alternatively one may partition a document to a number of parts and repeat the process of OS mapping to these collections of smaller content in the same way that an OSM is made from larger collection of contents.

The analysis includes, but not limited to, discovery of new ontological subjects, and discovery and verification of new associations between OSs. Over the time, new nodes and associations will show their importance by leading to growth of its newly discovered node or other nods, and finding the verified associations that are valuable to other contributors or is of commercial interest to commercial entities and ventures.

The system may also expand each OS to its constituent OS components and forms a more expanded OS spectrum for the document. In this way for each document we can form an almost distinguishable OS spectrum. The document OS spectrum bears important information about the value of the text compositions, its novelty and main points. Peaks and valleys may be used to analyze the content in terms of its novelty and an indication of possible new knowledge. For instance from the document spectrum we may select the highest amplitude OS as the main or principal subject of the text, then look at the next number of highest amplitudes OSs and form an abbreviated or abstracted spectrum of the text. Then compare this abstracted spectrum with the spectrum of the main OS already stored in the database, if there is a strong correlation between the abbreviated spectrum of the text and the principal OS spectrum in the data base, chances are that the content of the text does not bear much information. However for further checking one may look at the kind of statement and frames that is been used in the text to connect the components of the document spectrum to the main OS and compare it with the existing database of known relations between the these OSs. Generally there are more ways known in the art of spectral and signal analysis to evaluate the correctness and novelty of the text using the mentioned OS spectrum. When there are distinguishable peaks in the document spectrum that system does not have a record of verified relations for them, then the system mark them as novel and worthy of investigation and can compose a series of questions or suggestion to explain their relationship. It may also zoom to less amplified OSs and question and suggest a relationship between a high amplitude OS with a lower ones etc. All these information are available both to the editors of each shop and the creator of the content. The system or the editor of each shop can present such unknown to the public and solicit for contributions to the solution.

The strength of such a knowledge discovery system lies in its systematic processes, large number of potential participants, limitless subject matters, and its vast databases that are not readily available to individuals. The potential value of the system also lies in that the method enables measuring and quantification of one's contribution, both implicitly and explicitly to the advancement of the knowledge database.

To represent such knowledge to public, the system uses publishing/broadcasting shops as mentioned above. The system will receive the information content in the form of a text, audio, video, or any combination of them that is in general related to one or more subject or category, either solicited or not. The content received is tagged with a unique reference, authenticated submitter information such as such as digital signatures, biometric information, IP address etc. or any other means that is appropriate to make sure the content being submitted is uniquely tagged and owned by a real single entity, individual/s, agents, and legal entities and the like.

The subject or category can be identified by either a computer program or by the creator/s of the content, or by people other than the creator of content, or in general by any combination of these three groups. The system, then, with or without the help of the shop administrator/s, qualifies the content of submission as described above in terms of its merit novelty, importance, and impact. The system may further add the overall merits including of a submission by looking at the rank and credit of submitters, and their affiliations.

The system finds the authorities expert in the subject again by either computer programs automatically or by human, then the content is sent to one or more of these authorities which we call reviewers and ask them to evaluate, comment, make suggestions, give opinion, and feed back via an online communication channel such as email and the like.

The reviewer are being asked to evaluate the information content of the creator/s and give their feedback to either recommend the content for inclusion in the data or knowledge repository of the system for use by other users or clients, or being rejected for inclusion, or being included after a revision by the creator/s subject to satisfaction of the reviewer/s.

If the reviewers recommend the content for inclusion or online publishing/broadcasting conditionally, then the content and the comments or questions are sent to the creator/s and are given a creating time to send the revised content. The revised content along with the answers to the reviewer comments or questions can be sent to the reviewer again and ask for their recommendation either for inclusion in the data/knowledge base of the system or ejection. Then the creator/s will be informed of the final decision.

The subject matters are basically limitless as long as qualified reviewers can be found by human assistance or automatic program (a program which finds the authorities and rank them based an algorithm which we can call "Ranked Subject Matter Authorities or RSMA"). If the system cannot find qualified authorities then content can still be published under different collection, which is marked as non-reviewed contents. Since the publications are peer or expert reviewed, the collection is citable and can be used to the credit of creator of the content.

Paid subscriber to each or a number of shops, selling copies of contents, advertisement and all the known methods of electronic commerce revenue sources, may generate revenue for each shop and the system. Moreover, the system can be mandated from an entity to make an effort to find a solution to a challenging problem that is important for that entity. The system then splits the proceeds to all the contributing parties according to a predefined contract.

The commercial success of the system is mostly based on the substance of the contents published or broadcasted and the value of its service to the users. Therefore the system, in one aspect of this invention, will share the success to its contributors. Over the time, depending on the success of the a content in terms of its popularity and importance, a creator accumulates credit points and at some point they can claim their credits in some form of monetary valuable compensation, rewards, prizes, profit sharing, ownership etc. There is provided a method to quantify the importance of one's contribution to the art. The more a submitted content generates further ontological subjects and grows its node, the higher the rank of importance and contribution of content will be. Also ranking algorithm of linked databases, such as pagerank, can be applied to evaluate the importance and impact of content over the time.

Considering that each shop's title is also a node in the Ontological Subjects database, it is also possible to evaluate the overall rank and importance of the shops in a similar fashion. The success of a shop is measured by both its popularity and importance of its subject and impact as well as the revenue that a shop or the owner of the shop has generated. The system allows shop owners, with or without the help of system, to generate income by, for example, displaying other entities advertisement, banner, etc. or any other means appropriate and accepted by law. The system again is benefited from such income based on the predefined agreements with each shop owner.

The present invention provides a system and method for faster and efficient universal knowledge discovery by firstly providing and presenting the worthwhile and important subjects to explore and work on. Secondly, by having built the map of ontological subjects of the universe, assisting and guiding users to explore, and to assess their work and discover new knowledge of the subjects as fast as possible. Thirdly providing an environment for rapid expert reviewed circulation and publication of new or filtered knowledge that it is more credible and rigorous than non-reviewed published materials over the Internet. The described system and method does not impose any limit on the number of subjects and the number of content being received, thereby enabling exploration of all possible subject matters of interest and importance to the public and science while it maintains the desirable standards of the published contents. This will bring the cost of useful knowledge discovery significantly down.

Moreover the invention provides a system and method that allows people to get a fast assessment of their work universally and have a rapid access to the authorities' comment on a creation that they have worked on. The described method further provides access to the most updated, yet assessed, ideas and state of the universal knowledge.

Among the advantages of the present disclosure, in a preferred embodiment, is having a central system that allow all the qualified experts launch their own publication/broadcasting ventures with the least amount of investment and overhead for commercial gain. Furthermore this invention provides a method for rewarding the contributors by measuring the impact of their contributions and sharing with them the commercial success or profit of the system accordingly, thereby encouraging the brightest to participate in the advancement of the state of the art and economics.

It is also another object of this invention to build an upper or universal knowledge repository or ontological subject map that can address all the queries while it is expanding over time. Such a map can help the users to confidently navigate through state of the art knowledge of universe and effectively guiding them in their research leading to new discoveries.

DETAILED DESCRIPTIONS

Figure 1:
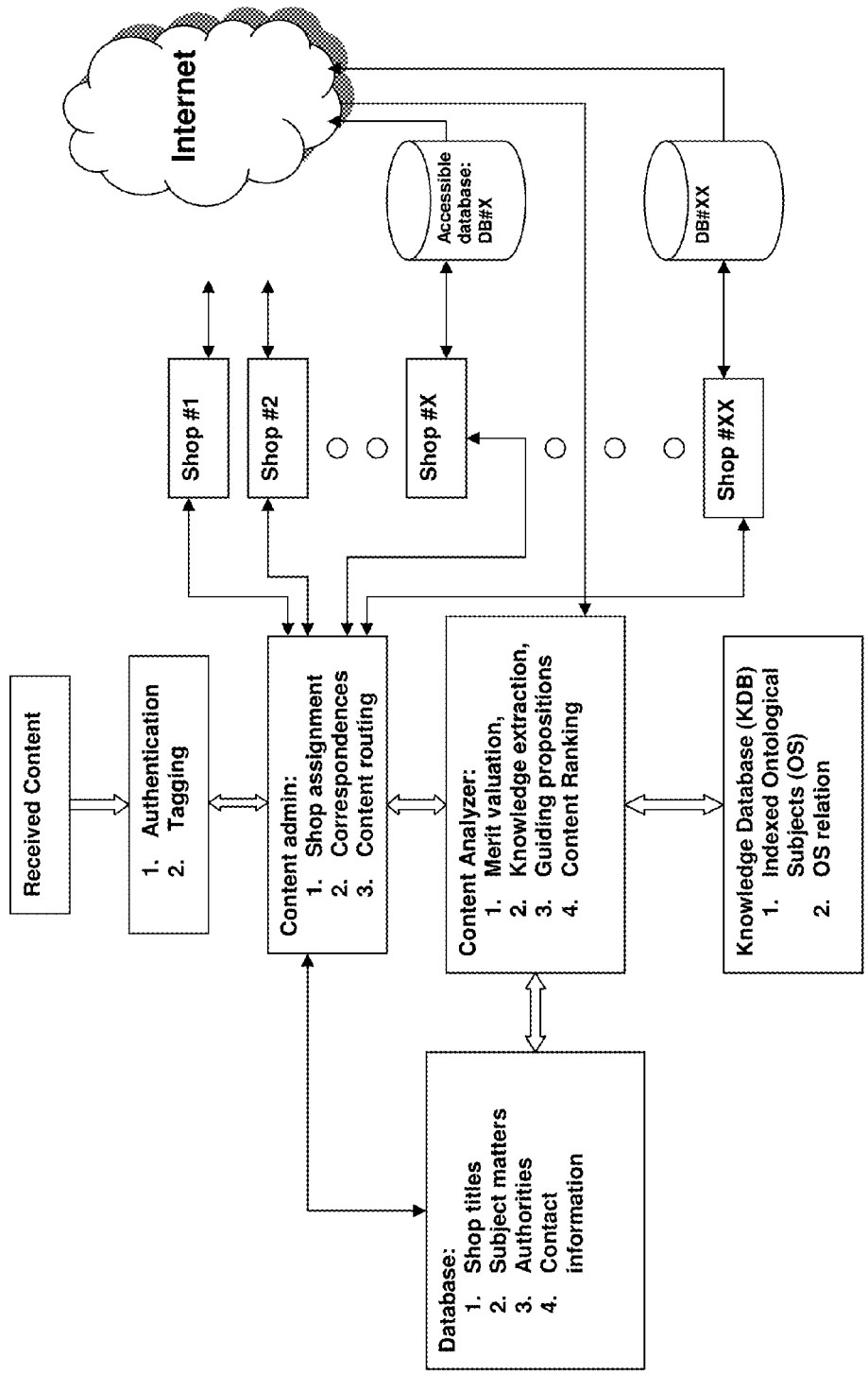
FIG. 1: Illustrates one simplified exemplary architecture of knowledge discovery and publication/broadcasting method according to the present invention

The invention is now described in detailed disclosure accompanied by several exemplary embodiments of the system and its building blocks.

Without restriction intended for any form of electronic contents such as text, audio, video, pictures and the like, we start by describing the embodiments with regards to inputs that are in the form of text. However, for other forms of electronic content the present methodology and process can be used once one considers that all types of electronic contents are different realization of semantic representation of universe. Therefore a semantic or knowledge representation transformation will make the current description applicable to all forms of electronic contents submitted to the system.

To be clear throughout this description lets define "Subject Matter (SM)" and "Ontological Subject (OS for short)" at the beginning. Generally, any string of characters can be a "Subject Matter (SM)" or "Ontological Subject (OS)" according to the definitions of this invention. Less generally, they could be any word or combination of words. Therefore SMs and OSs have in principal the same characteristics and are not distinguishable from each other. Yet less generally and a bit more specifically, a subject matter (SM) is a word or combination of words that shows a repeated pattern in many documents and people or some groups of people come to recognize that word or combinatory phrase. Nouns and noun phrases, verbs and verb phrases with or without adjectives are examples of subject matters. For instance the word "writing" could be a subject matter, and the phrase "Good Writing" is also a subject matter. A subject matter can also be a sentence or any combination of a number of sentences. We define "Ontological Subjects (OS)" as subject matters worthy of knowing about. They are mostly related, but not limited, to nouns, noun phrases, entities, and things, real or imaginary.

Furthermore, in the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

1. Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "for instance", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

2. Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

3. Any combination of one or more computer-usable or computer-readable media may be utilized. For example, a computer-readable medium may include one or more of a portable computer diskette, wearable data processing devices and units, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

4. Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

5. The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

6. As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

7. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).
8. Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

Now the invention is disclosed in details in reference to the accompanying Figures and exemplary cases and embodiments in the following subsections.

Referring to FIG. 1, there is shown one brief and simplified schematic block diagram of the system of knowledge discovery and publication/broadcasting method. The system is consisted of one or more databases and one or more publishing/broadcasting shop. Computer software programs are provided for providing the services to the users. As shown, the system first receives content through a communications media such as internet where upon authenticate the submission and tags it with the desired tagging information. Then the submission is passed to the content admin. The content admin job is to find and assign the right shop that the content should be considered for publishing or broadcasting, find the expert related to the subject of the content from the database and once the content analysis and revision is complete, send it to the corresponding shop for inclusion to its database accessible by other users through communication means such as Internet. Content admin also passes the content to the content analyzer. Content analyzer role is to evaluate the submission merit in terms of its credibility, informative statements, investigation of existence of new knowledge and any other criteria that might be related to the values of a submission. In doing so, the content analyzer consults with the pre-built knowledge database that contains the indexed Ontological Subject (OS) and their relations.

The important step in building such a system proposed in FIG. 1, is to build a repository of subject matters of importance and interest.

Figure 2:
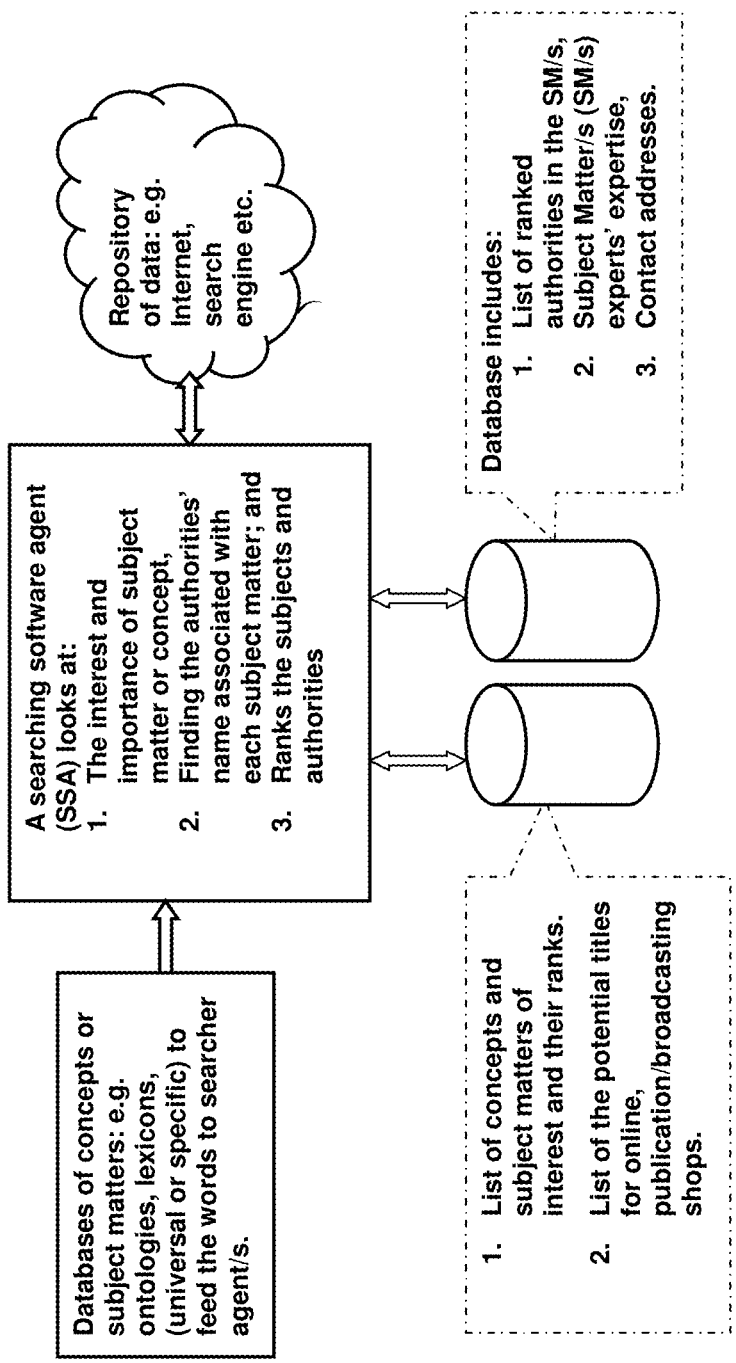
FIG. 2: An exemplary schematic of building the repository of subject matters and corresponding authorities with their ranking and contacts information using general databases.

In FIG. 2, the flow diagram of identifying and finding subject matters of interest for discussion, research, and further investigation for online system inclusion is illustrated. FIG. 2 shows the process of finding the subject matters and a potential title for e-pub/broadcast shops. This can be done by feeding a list of concept from a primary knowledge repository such as lexicons (e.g. Wordnet) or a semantic frames list (e.g. Framenet) or from a universal ontology (e.g. SUMO, the suggested upper merged ontology), or any other such lists of subjects assembled automatically or manually, to a Searching Agent (SA). The SA can search the internet and look for specific information such as the number of documents over the internet dealing with a specific term or concept, or find a relation between any concept and proper noun entities who have contributed in that subject, or any other desirable task. Such searching agents, also called intelligent search agent or web robots, can vary in their tasks. In an article, by G. M. Youngblood entitled, "Web hunting: Design of a Simple Intelligent Web Search Agent," appeared in the ACM Crossroads Student Magazine (summer 1999), there is provided the basic elements of intelligent agents that are used for construction of intelligent Web search agents. The article describes the basic principals of composing such web robots to do a variety of tasks by searching through the databases in the Internet. By Internet database, it is meant all forms of data that can be found from a single web page to the more structured databases like specific domain databases of published material, to the whole databases of a search engine company such as Google or Yahoo or MSN and the like.

In particular a web robot can be employed to do searching through a search engine and finds the roughly total number (counts) of web pages containing a word, or a phrase, or count of co-occurrences of each two OS. Furthermore it can be programmed with such programming languages like Perl, Python, AWK, and many others like C, C++, C# and the like, to look for specific textual patterns, co-occurrence of words within certain proximities and basically extracting any type of character string that is desirable in a text. Those familiar with Natural Language Processing (NLP) and Computational Linguists (CL) can readily use such languages to write scripts and programs to extract different types of textual information from a text. In principal it is possible to parse sentences, simplify compound sentences, rephrase text, summarize, finding lexical elements such as noun phrases, extract proper nouns or named entities, synonym replacement, syntactic and semantic analysis of a text, make lists, build databases, manipulate strings of characters, and generally can execute any algorithm that is designed for a specific goal. A good introduction to the subject of NLP and CL can be found in the web site of "American Association for Artificial Intelligence," organization (www.aaai.org). Another good source is a book entitled "text mining application program" by Manu Konchady, published by Charles River Media, Boston, Mass., 2006. The book provides information, teaching, training, and many accompanied application programs to perform the tasks mentioned here.

Referring to FIG. 2 again, a searching software agent (SSA), that includes a SA, is employed to search, gather and analyze the information available in the Internet for the specific purposes. One primary function of such SSA in this configuration is finding the important subject of interest to the society and their importance or rank, from the whole available human knowledge repository, such as Internet. The second important function of software agent, that also includes a SA, in FIG. 2, is to find the name of the real entities, individuals or agents, considered expert in each of these subject matters, and extract their affiliation and contact address.

There are a number of ways of doing this task. One simple way to find and list the important subject matters of interest is to use a search engine and look at number of web pages that contain that term or phrase. The term or phrase, is to feed to SSA, can be from any list of words, such as dictionaries, ontologies, list of proper names, or any list of words and phrases that exist or may exist. Search engines usually show the web counts (or hits) that can be used as an indication of importance of a term. The web counts that a search engine shows indicate the level of obsession and importance to the society, though not an exact indication of intrinsic value of a subject matter. Specially searching for web count of general nouns such as Science, Physics, Biology, or combination of them such as "Biophysics" or "Biochemical machine" and seeing a large number of documents containing that term is an indication of human obsession to that term and hence its intrinsic importance in human life. More sophisticated rules and algorithms and criteria may be devised to find important subject matters.

Figure 3:
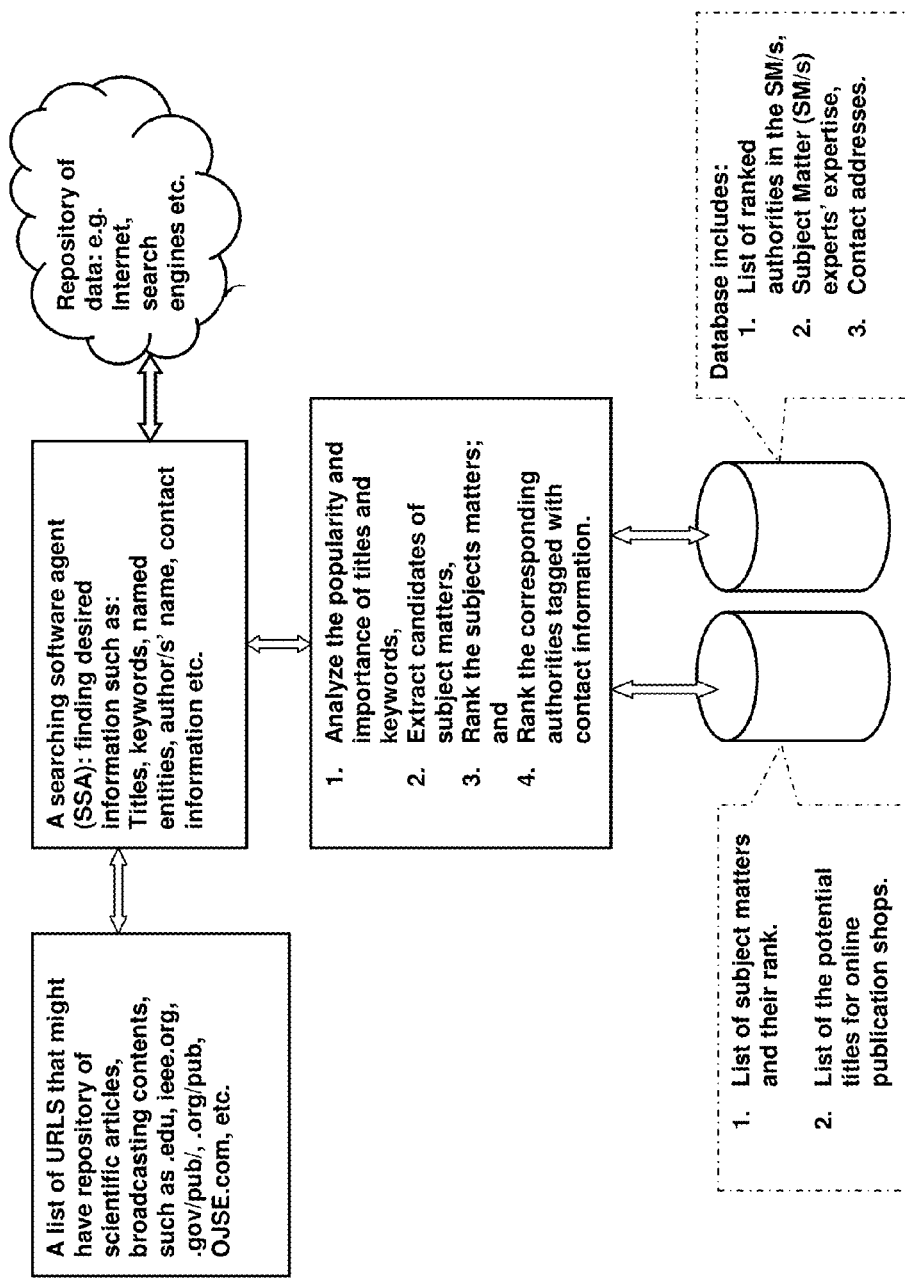
FIG. 3: Another exemplary schematic of building the repository of subject matters and corresponding authorities with their ranking and contacts information using targeted databases.

FIG. 3, shows a more effective way to find important subject matters and the name and address of the authorities. In this configuration the SSA is provided with the address of URLs that have rich repository of subject matters and terms of interests and they also contain name and affiliation and addresses of a large number of experts. For instance SSA can be used to extract a subject matter and the individual name and address associated with that subject matter, by searching in all the universities' web sites that usually contain ".edu", scientific organizations such as "ieee.org", online content stores such as "amazone.com", and many other online content collections. These collections contain the title, the expert names, and other necessary information that can readily be extracted by the searching agent/s. For example, in the paper entitled, "White Page Construction from Web Pages for Finding People on the Internet", appeared in Computational Linguistics and Chinese Language Processing, vol. 3, no. 1, February (1998), by Hsin-Hsi Chen, Guo-Wei Bian, the authors describe a method of finding the name and extracting the contact address of individuals from the Internet.

Consequently the system shown in FIGS. 2, and 3 will create a list of subject matters and find an appropriate title that will reflect the essence of the subject matter and put them in a list of Subject Matters, i.e. SMs. The list of SMs may or may not be hierarchical. The system in FIGS. 2, 3 will further create a list of individual expert considered authorities for each subject matter. The list of authorities may also be ranked according to certain metrics for example the number of quality contribution to each subject or how many times other have referred to them or their work, or how many important sources have referred to them, etc. Different algorithm can be used to rank the subject matters and authorities.

Figure 4A:
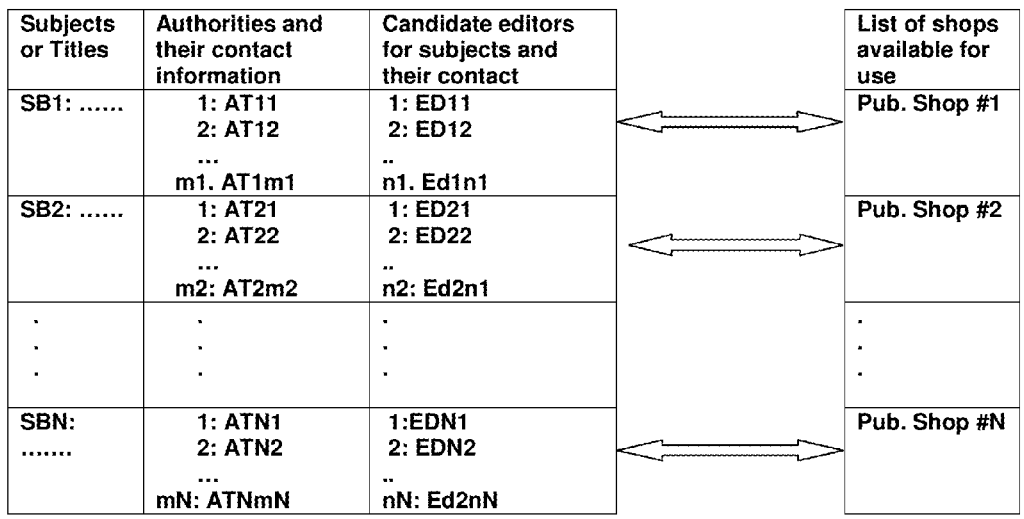
FIGS. 4A, and B: Shows the content of the basic databases of publication/broadcasting shops available for users and subscribers, 4A is provided by automatic method according to invention, and 4B is the list of user suggested shops according to invention.
Figure 4B:
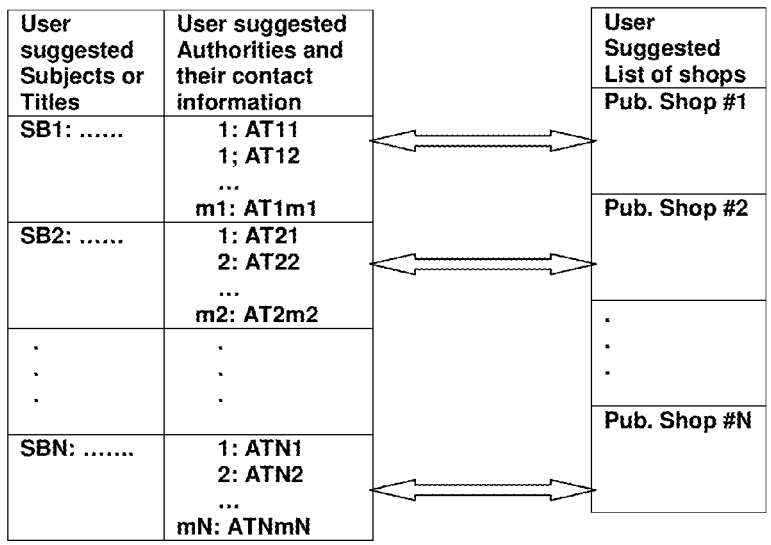

FIG. 4A, shows the list of the titles or subject matters, their corresponding authorities, the list of shops with the title available, and the list of qualified people who are eligible candidates for running a shop. Titles are not necessarily the same as subject matters but they are preferable if they reflect their corresponding subject matter. FIG. 4B, shows that such a list may also be proposed and referred by users other than the list that the system has built. The list is available for interested user who wants to publish an online journal or a broadcasting shop. Users, who want to establish their own online publishing/broadcasting shop, then may apply to subscribe or buy online publishing/broadcasting shop's title/s among the topics and titles available or by their own suggestion to the system. Interested users can include individuals, legal entities, and a group of individuals as well as computer agents. The system (could be called as the main host) may also publish and administer as many shops as it desires under its own administration. The system (main host) will grant the privilege of establishing an online publication/broadcasting shops according to the system's predetermined standards. The system however needs not to be physically located at one place and different parts of the system, such as servers, databases, storages, or even control and administration may be placed or done in different places.

Once the application is approved and a title of publishing/broadcasting shop is assigned to the user, the owner of the shop can use the service of the system and start soliciting or being open to receive contents, and providing the service to her/his/its group of people interested in that subject matter. The system or administrators of the publishing/broadcasting system may also invite certain individuals to administer one or more of the publishing shops and act as editor or promoter of the journal (publishing/broadcasting shop). For instance a computer program identifies subjects of interest by searching and analyzing the information available, e.g. by automatically searching the internet, and finds association between a subject of interest and the authorities in the subject and invites them to administer and to establish their own online journal using certain rules and protocols that is provided by the host publisher (the main publishing site and system). New subjects can be introduced or proposed by a user and once the user's authenticity and credit is established the user can also establish her/his/its own shop with the proposed title or subject.

The subject matter is basically limitless as long as qualified reviewer can be found by human assistance or automatic program (a program which finds the authorities and rank them based an algorithm which we can call "Ranked Subject Matter Authorities or RSMA"). If the system cannot find qualified authorities, then content can still be published under different collection which is marked as non reviewed contents. Since the publications are peer or expert reviewed the collection is citable and can be used to the credit of creator of the content.

Figure 5:
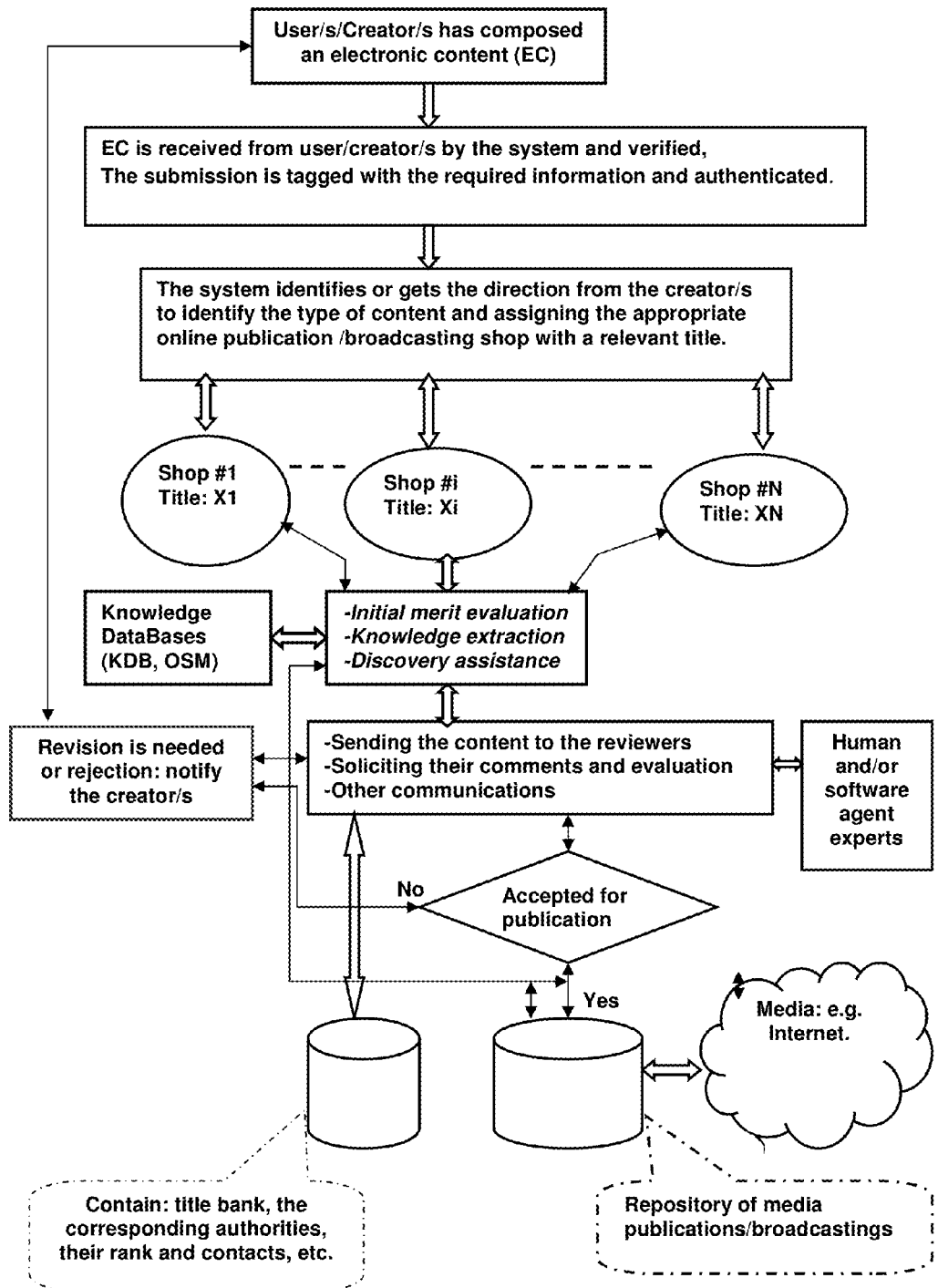
FIG. 5: Shows exemplary building blocks and process flow of publication/broadcasting method according to the invention.

Referring to FIG. 5: it shows another embodiment of online publishing system according to the present invention in more details than FIG. 1. The system is composed of N (being an integer) number of online shops. The shops have been established by real individuals, or other entities and/or even computer agent, which administer a publishing shop or journal. The system receives contents by creator/s through; for instance, its webpage or any other means of communication. The system initially tags the received content with the required and desired information, such as date and time of submission and IP address of the submitting computer and the like. The system also provides for interested people to subscribe to one or more of shops by online registration process, which is customary in the e-business. The creator may or may not be a registered subscriber of member of the system or any of its shop. The readers and contributors (creators) can usually search the system to find their shop of interest to read or submit their content or manuscripts. If the creator does not specify its respective shop then the system will assign a shop for considering the submitted content for possible online publication/broadcasting. The system or administers of the publishing/broadcasting shops may also invite certain individuals to administer one or more of the shops and act as editor or promoter, or provide reviewing service.

In the preferred embodiment, the content is submitted through the main publishing host and therefore each content being submitted get the submission date that can be used for crediting the contributor/s or as an indication of priority.

As shown in the FIG. 5, once an information content is received by the system and the subject or main semantic is assigned, the system will find the authorities expert in the subject again either automatically by computer programs or by human, then the content is sent to one or more of these authorities which we call reviewers and ask them to evaluate, comment and give opinion and feed back, etc. via an online communication channel such as email and the like.

The reviewers are being asked to evaluate the information content of the creator/s and give their feedback to either recommend the content for inclusion in the data or knowledge repository of the system for use by other users or clients, or being rejected for inclusion, or being included after a revision by the creator/s subject to satisfaction of the reviewer/s.

If the reviewers recommend the content for inclusion or online publishing conditionally, then the content and the comments or questions are sent to the creator/s and are given a creating time to send the revised content. The revised content along with the answers to the reviewer comments or questions can be sent to the reviewers again and ask for their recommendation either for inclusion in the data/knowledge base of the system or rejection. Then the creator/s will be informed of the final decision. It should be mentioned that the reviewers, in general, could be intelligent expert agents in that subject matter. The content after final acceptance will be included in the repository of the corresponding shop. The accepted content can then be published immediately and being made available to the users (readers) and be readable by special software for viewing such materials such as the Zinio's digital publishing software (www.zinio.com) and/or being collected and released periodically in the form of a magazine or any other format that is desired and available based on the capabilities of the state of the art at the time of publishing.

Referring to FIG. 5 again, there is the block that will initially assess the merits of the content being submitted. The block consults with knowledge data bases (KDB, OS map) and extracts the knowledge in the content and also assists the creators and users in general by providing the analysis results, and guides them to enrich their content. The knowledge database shown in FIG. 5 contains an index of ontological subjects.

Figure 6:
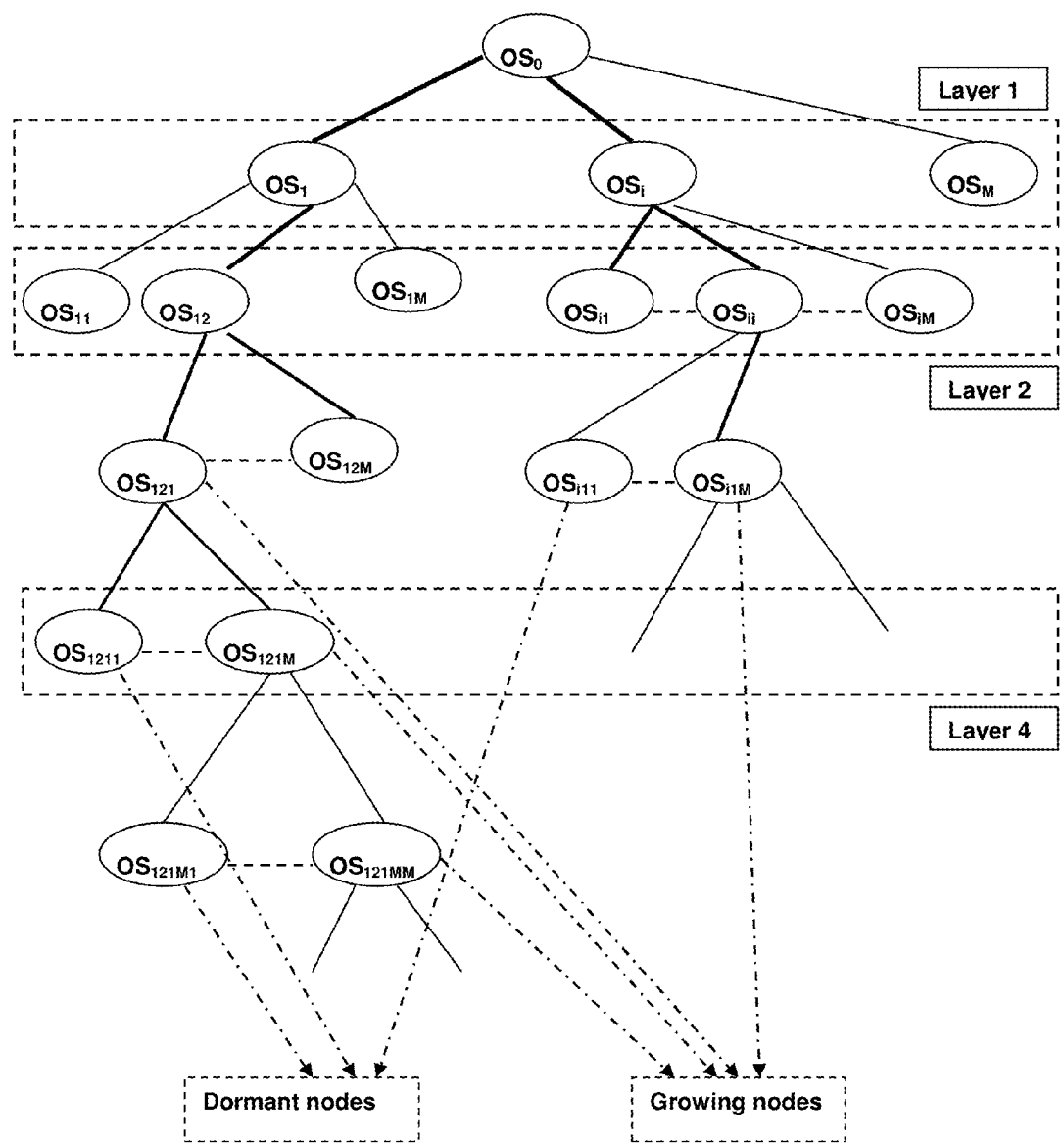
FIG. 6: Shows one exemplary graphical representation of the ontological subject association database (or Ontological Subject Map, OSM) according to the invention.

FIG. 6 shows a layered indexed repository of universal knowledge that is built by indexing all related existing concepts and subjects, nouns, proper nouns, compound nouns, named entities or in general all such conceivable entities, that is called ontological subjects (OS) in this invention, as defined earlier. As seen, a node in an open 2-dimensional tree like graph may represent an OS. The graph is called "Ontological Subject Map" or OSM for short, in this invention.

Figure 7:
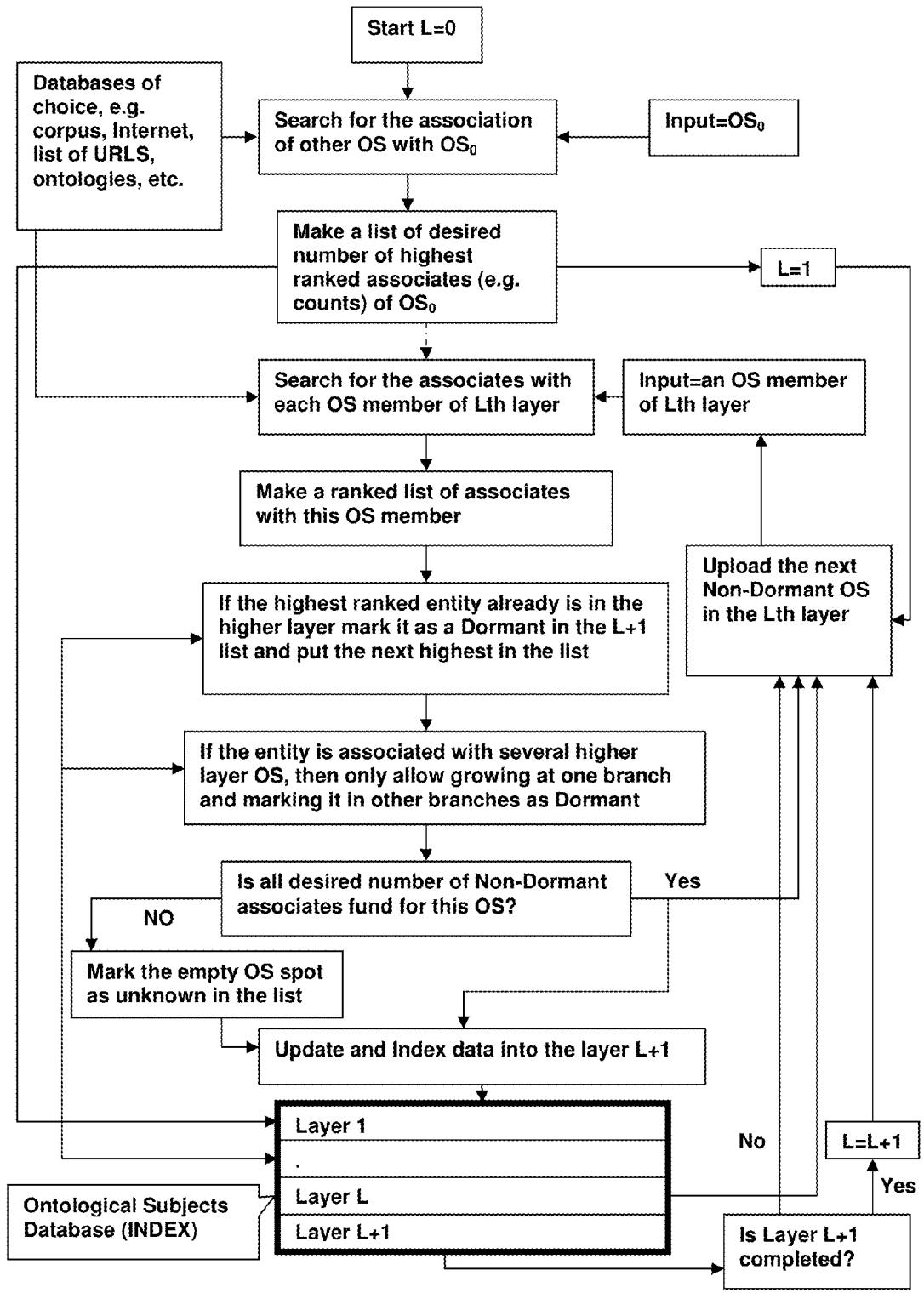
FIG. 7: Shows one flow diagram of the process of building the ontological subject association database (i.e. OSM).

FIG. 7 shows one preferred exemplified algorithm to build the index in FIG. 6. The index in FIG. 6, is built by starting from one or a number of most popular ontological subjects and searching the available databases to find all other ontological subjects associated with each of them ordered by their association ranks (e.g. counts). On simple way is using a search engine and searching for a combined pair of OS and looking at the web counts figure. Then each ontological subject is indexed with a desired number of other ontological subjects, i.e. associated set of ontological subjects, in each layer ordered by their association ranking. The association rank/order therefore, in this situation, is based on the co-occurrences of the pair of OSs, in which one is considered the associate of the other, and/or importance (e.g. occurrence counts) of the associate OS. Once this layer is constructed and indexed, the procedure is repeated, to find the most related OSs with each member of this layer. The index consists of several index frames that can uniquely identify each OS on the OSM. As an example, the indexing frame can be a multi digit frame that can accommodate the desired or predefined maximum number of association with an OS. For example a 3 hexadecimal number (a 12 bit frame) can uniquely identify up to 4096 OSs in connection to its upper layer node. In one exemplary embodiment of OSM shown in FIG. 6, the indexing is done as follows: the number of indices shows the layer that the OS is in, and the values of the indices, excluding the last index frame, points to the OS in its above layer that is associated with, while the value of the last index frame indicates its association rank with its above pointing OS node. More indexing frame can be added or defined for other purposes.

In FIG. 6, however, for ease of depiction only the value of each frame is shown. Accordingly, for example $OS_1 \ldots OS_M$, belongs to the layer "1" (one), and $OS_{xyz}$ represents an OS in layer "3" (because it has 3 indices) which is the zth highest associate of $OS_{xy}$, in the layer "2". $OS_0$ is not counted as a layer and while basically can be any Ontological Subject (as the starting point), we consider it to be "the whole information that there is in the internet" and therefore the layer 1 in FIG. 6 consisted of basically the most popular Ontological Subjects (OS) in the Internet Although not necessary, in searching for OSs of the layer 1, we may, exceptionally, want to exclude proper names in order to find the most substantiated OSs for layer 1 (one).

Referring to FIG. 6 again, each node therefore is only connected to its above OS node and a number of other nodes below it. In each layer there are two types of nodes, namely Dormant or Non-Dormant (growing). In each layer a node is dormant if the corresponding OS is already been growing in upper layer/s or the same layer. In a situation and according to one exemplary embodiment, if an OS is found to be associated with more than one upper node, and it is not growing in an upper layer, then it will become Non-Dormant only under a single node for which it has the highest ranking association, which is an immediately above node. In this manner each ontological subject is growing only once in the whole index. Therefore each non-dormant node is connected to one node above it and is connected to a number of nodes below. Dormant nodes are only connected to its immediately above node. Dormant nodes also are tagged with the information that points to their open position (growing place) in the database. Moreover if desired number of associated OS was not found for a node, then we add extra nodes and mark them as unknown. The desired number of associated OS for each node can be selected based on predefined criteria. For instance one criterion might be to ensure that certain numbers of growing nodes are existent under each OS. However for simplicity we may choose a constant number of associations for each node and assign a minimum certain portion of them to be non-dormant. Also in practice one may choose or defines other indexing formats and methods as long as the OSs and their association information are uniquely indexed in the database.

Figure 8A:
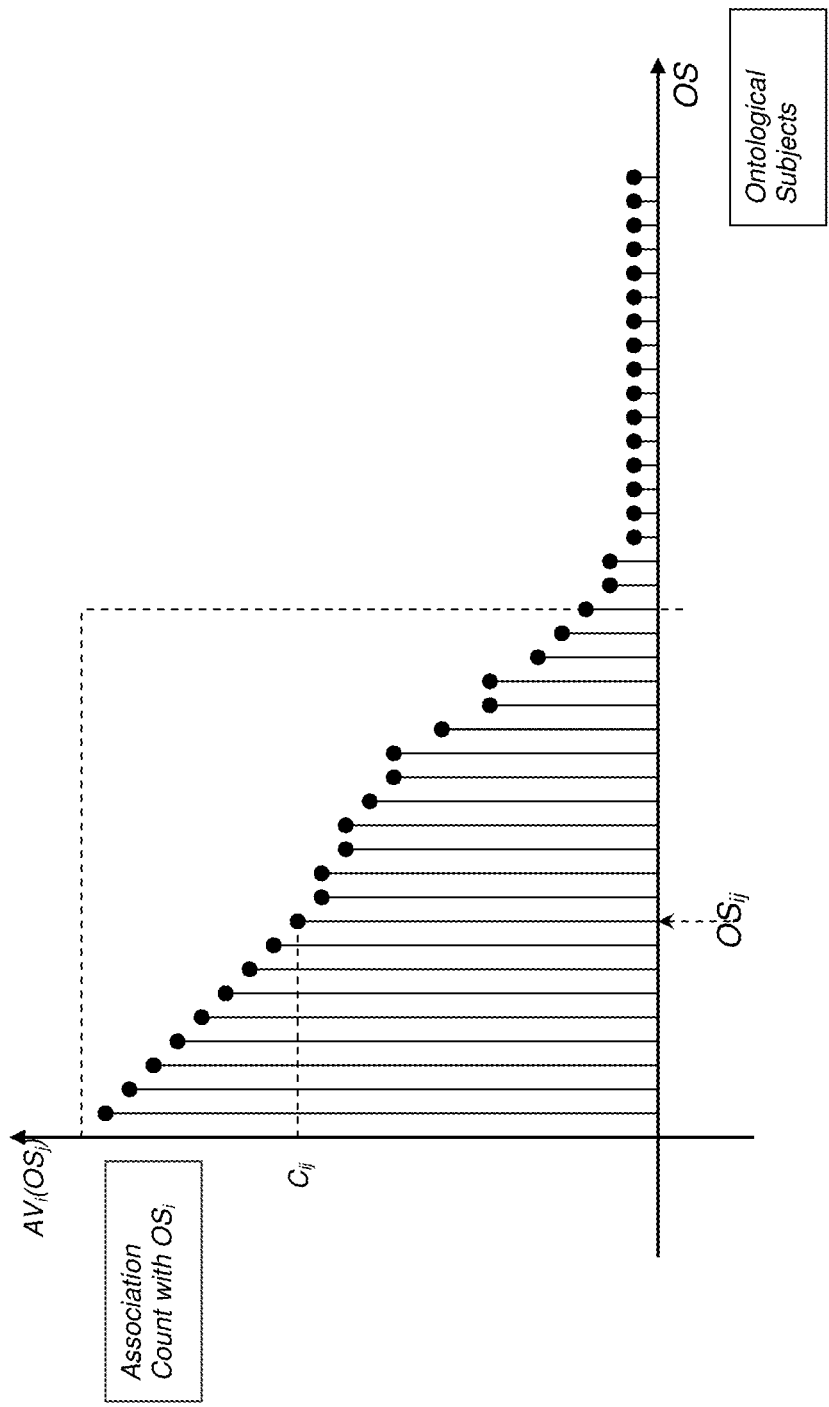
FIGS. 8a and 8b: Show exemplary representations of an OS versus its associated OS (constituent OS): A: the constituent OSs ordered by their association value to the $OS_i$ and B: The Association Value (AV or AVD) function representation of an OS or a document in relation to universal OS axis (domain).

Referring to FIG. 8a now, we may represent an OS with a discrete spectral like function whose horizontal axis is the associated OSs and the vertical axis is the ranked or weighted value of each associate. The rank or the weighting value, for instance, could be a function of the co-occurrences of an associated OS with said OS and/or importance (e.g. its frequency of occurrence) of the associated OS. For example, associated OSs of a particular OS are usually the ones that have co-occurred with said particular OS in some content. Those who co-occurred the most then have higher association value to said particular OS. Also with two associate OSs, having similar co-occurrences with said particular OS, the one which is itself more valuable (e.g. has higher, or in some situations a lower, frequency of occurrences) then can be even more valuable to said OS. Therefore in this situation the value of each associate to an OS (e.g. value of an association value function) is based on how often it has co-occurred with said OS and the importance of the associate. In other word the association value function of an OS become a function of its co-occurrence with other ontological subjects and the importance (according to some measure of importance) of the other ontological subjects that co-occurred with said OS in for instance a predefined proximity from each other in a content or its partitions. In this way an Association Value (AV) function is defined and stored in the database for each OS for later usage.

In FIG. 8a, the AV function is depicted versus the constituent OS in its lower layer as indexed in FIG. 6 which starts and numbered from the strongest association and declines towards the higher numbered indices. Here again an association between OSs considered stronger when they demonstrated higher association value. However in FIG. 8b, the AV function is depicted versus the constituent OS of the whole OS association database (universal OS map). That is, in FIG. 8b, the horizontal axis covers all the existing OSs and is universal. The association value (AV) function can be considered a signature spectrum of an OS. Using signal-processing techniques, such as cross correlation, autocorrelation, Fourier Transformation or Discreet Fourier Transformation (DFT) one is able to extract the information and find a hidden relationship between OSs. For instance using the concept of power spectral density one may define and measure the power or energy of an OS as a sign of its importance or for approximate reasoning application, or comparison, or the like. For instance in FIG. 8a or 8b, we can define an energy function, (i.e. integral over the power spectral density) for the OS and in selecting the desired number of constituent OSs we may chose enough number of constituent OS so that they will account for the 98% of the total energy of the OS node.

Concurrent with or after the indexing of OS association is completed, another software agent will look for the kind of associations between each OS and it's associates by searching through databases such as WordNet, FrameNet, the whole internet, or any such a database that a relation between an OS and its components is expressed by natural languages. The agent will look for patterns of explicitly expressed statements, such as SVO sentences, to establish the kind of relationship between each two OSs. The agent may also use natural language processing (NLP) methods and algorithms such as text simplification, to find such an association pattern. However since there is a vast amount of textual data available, the chances are that the agent will be able to find the explicitly expressed and verified statements, composed by humans, that the agent is looking for. The verification of relations is done by statistical analysis of the database. Diversity of sources and the number of times that a statement is repeated to express a relation between two OS leads to the verification of that statement. These statements, expressing a relationship between an OS and its components also stored and indexed for further reference.

This database is then used to assess textual documents or any electronic content, such as audio or video, pictures, graphs, curves and the like, that its information can be transferred to textual format. The system first extracts the ontological subjects of a document and forms an OS spectrum for the document, with predetermined weighting coefficients rules. For example depending on the position of an OS in the text and counts of each OS, a coefficient for that OS is assigned. The weighting coefficient therefore is an indication of importance according to one or more importance aspects. Also, for instance, one may partition a document to a desired number of parts such as chapters, pages, paragraphs, or sentences and repeat the process of OS mapping to these collections of smaller content in the same way that an OSM is made from larger collection of content, i.e. finding the association and co-occurrences counts of each two OS. The document association spectrum then is usually a function of co-occurrences of ontological subjects in predefined proximities or partitions of a content and one or more weighting coefficients of one or more of the ontological subjects.

Figure 8B:
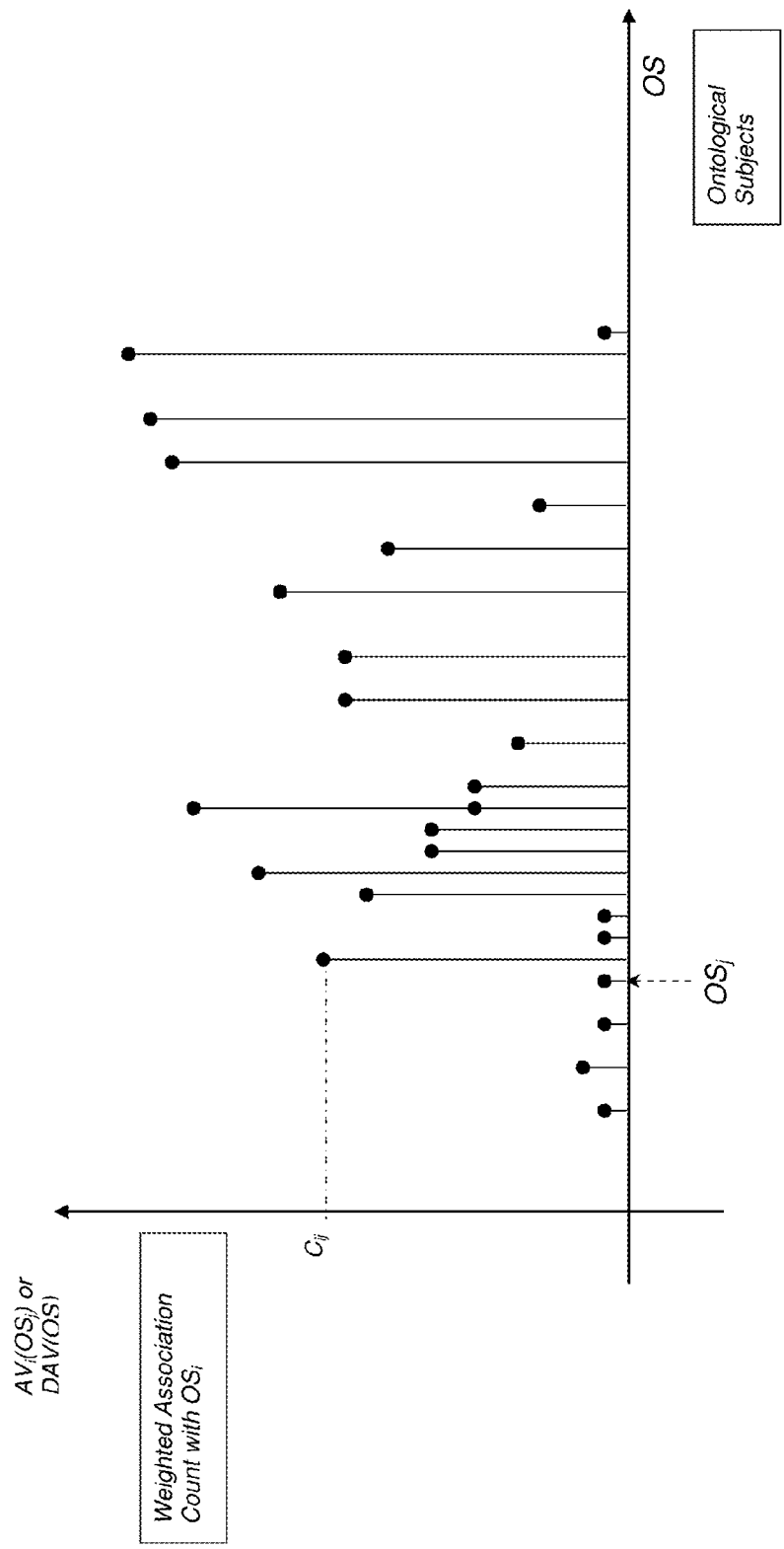

FIG. 8b shows that an AV function of an OS may as well represent an OS spectrum of a document. In this case it is called a Document Association Value or DAV function as shown in FIG. 8b. In one simple aspect of the invention, the system can select an OS as the principal OS of the document and compare the document spectrum with that stored in the database (OSM), for further analysis. The analysis includes, but not limited to, discovery of new ontological subject, and discovery and verification of new associations between OSs. For instance one can subtract document spectrum of the principal OS (made from the document) from the universal spectrum of the same OS, then observe peaks and valleys that might correspond to new relations or new nodes, or filling one of the unknown nodes in the universal OSM. Other sophisticated analysis can also be applied without departing from the spirit of this disclosure.

Figure 9:
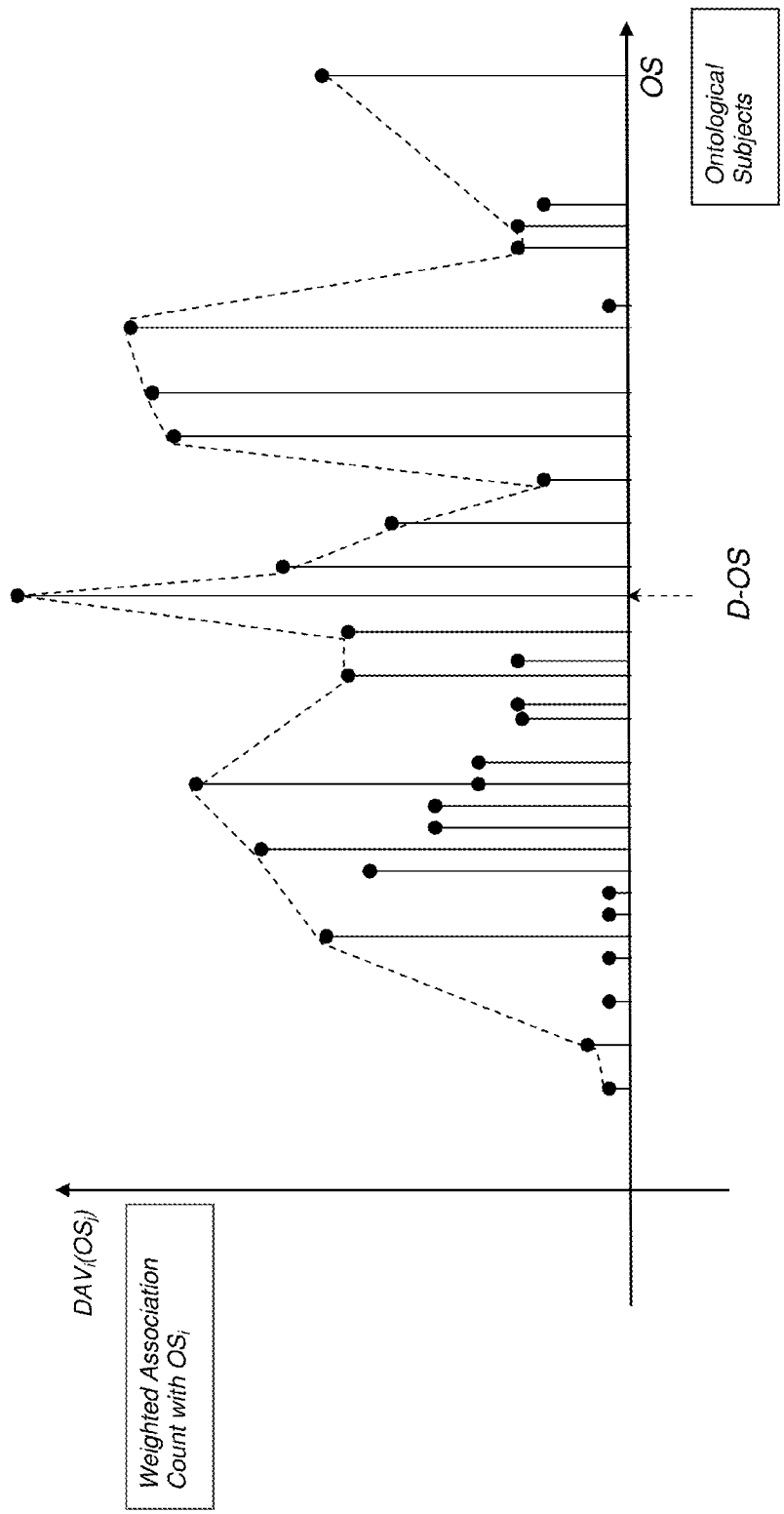
FIG. 9: Document Association Value (AVD) function of a document, after all or some of constituent OSs were expanded.

FIG. 9 shows that the system may also expand the spectrum of each OS or each document to its constituent OS components and forms a more expanded OS spectrum for the document. In this way for each document we can form an almost distinguishable OS spectrum. The expansion might be done several times for various reasons depend on the need and objective of the analysis. The document spectrum bears important information about the value of the text composition, its novelty and its main points. Peaks and valleys may be used to analyze the content in terms of its novelty and an indication of possible new knowledge. For instance from the document spectrum we may select the highest amplitude OS as the main or principal subject of the text, then look at the next number of highest amplitudes OSs and form an abbreviated or abstracted spectrum of the text. Then compare this abstracted spectrum with the spectrum of the main OS already stored in the database, if there is a strong correlation between the abbreviated spectrum of the text and the principal OS spectrum in the data base, chances are that the content of the text does not bear much information. However for further checking one may also look at the kind of statements and frames that have been used in the text to connect the components of the document spectrum to the main OS, or to each other, and compare it with the existing database of known relations between these OSs.

Figure 10:
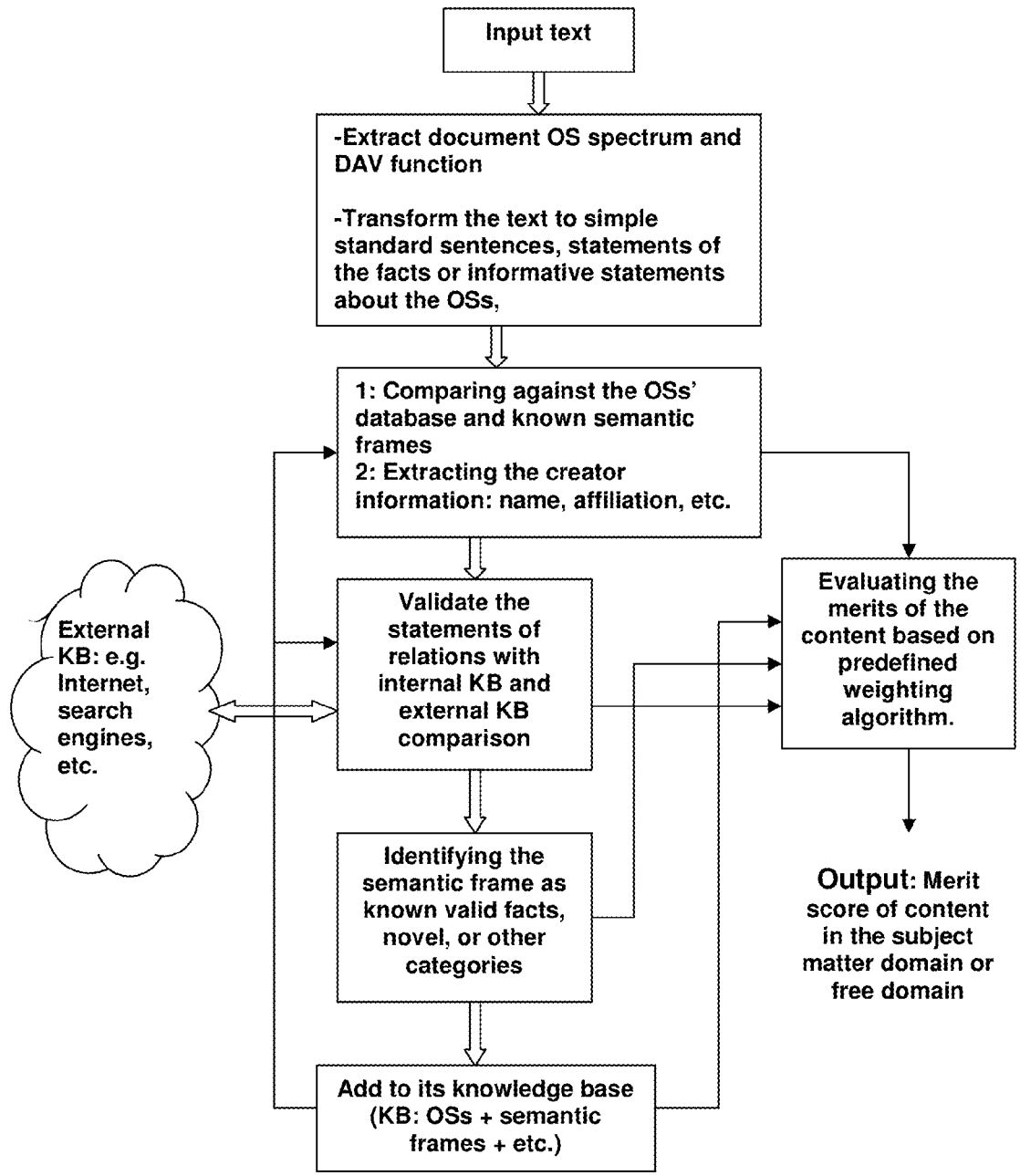
FIG. 10: One exemplary flow diagram of extracting, indexing, and updating the database of association statement/frame and scoring the merit of an input.

FIG. 10, shows how the knowledge database of OS associations and relational statement can be used to evaluate the merits of a content being submitted to the system as an initial evaluation as shown in the FIG. 5. The submitted content is simplified by natural language processing (NLP) techniques and algorithms to simplify the text and extract its Ontological Subjects along with the statement of the facts about the OSs and the associations of the OSs in the document as stated by the creator of the content.

The resultant OS spectrum of the document and corresponding associating relationship between the OSs of the document, is compared both with the internal knowledge database of the system as shown in FIGS. 6-9 and also checked and compared with the knowledge database of outside the system, e.g. Internet, for further assessment. Overall based on the verified statements and novel statements and novelty of the content in comparison with the indexed OSs and their stored relationship in the system and what is already known in the outside KDB and also by checking the affiliation and ranks of the creator/s the system assigns an overall score of merit. If the score is above the predefined threshold, depending on its internal criteria, the system then considers it for review by authorities as explained earlier.

Generally there are more ways known in the art of spectral and signal analysis to evaluate the correctness and novelty of the text using the mentioned OS spectrum. When there are distinguishable peaks in the document spectrum that system does not have a record of verified relations for them, then the system marks them as novel and worthy of investigation and can compose a series of questions or suggestion to explain their relationship. It may also zoom to less amplified OSs and question and suggest a relationship between a high amplitude OS with a lower ones etc. All these information are available both to the editors of each shop and the creator of content. The system or the editor of each shop can present such unknown to the public and solicit for contributions to the solution.

Figure 11:
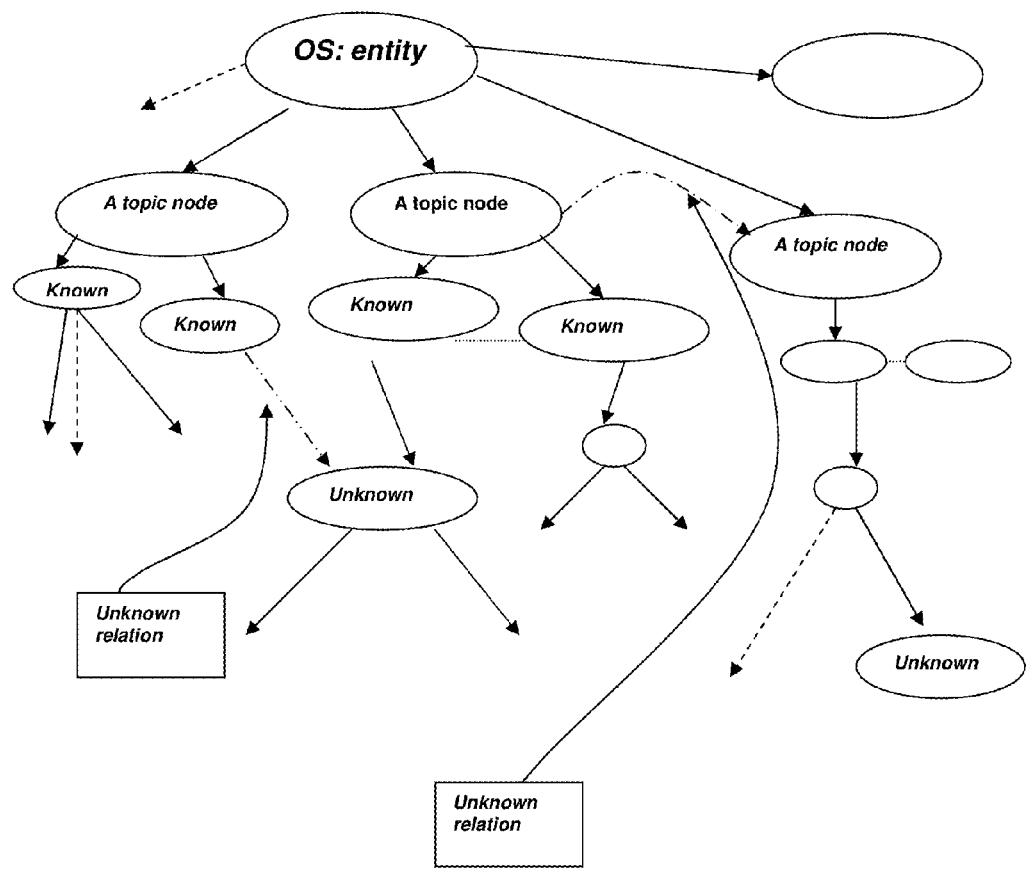
FIG. 11: Another exemplary representation of an OS association graphs indicating that each shop is considered as node and shows there could exist some unknown nodes and relations.

FIG. 11 shows another representation of an OS, expanded one or more times to its constituent OSs, whereas existence of other OSs and novel and unknown relationships has been detected. Each OS association, unknown to the system, in the FIG. 11, can be considered as topic of discussion or possible worthy of having a shop of its own. The existence of possible novel relationships can also guide the editor or administrators as well as the users or creator/s of the content to places for further focus and zooming investigation.

For instance assume in FIG. 11 the main OS and topic is "skin cancer" and the system has detected by spectral expansion and analysis, or led to the existence of some unknown OSs that possibly are associated with some known OSs such as health, aging, physical exercise, genome, parents, the age of earth, the age of sun, or eating, children, etc. Then the system pose a question as what is the relation between the age and skin cancer, what is the relation between the age of the sun and skin cancer and what is the relation between number of children and the skin cancer and so on. Once these questions are answered and verified by the process explained in FIGS. 6, and 10, there will be more nodes added in the OSs database and the association database and then there will be more questions to ask. The process, then leads to finding the verified answers and statements that establishes new OSs and its association information in the Knowledge Database (KDB).

Figure 12:
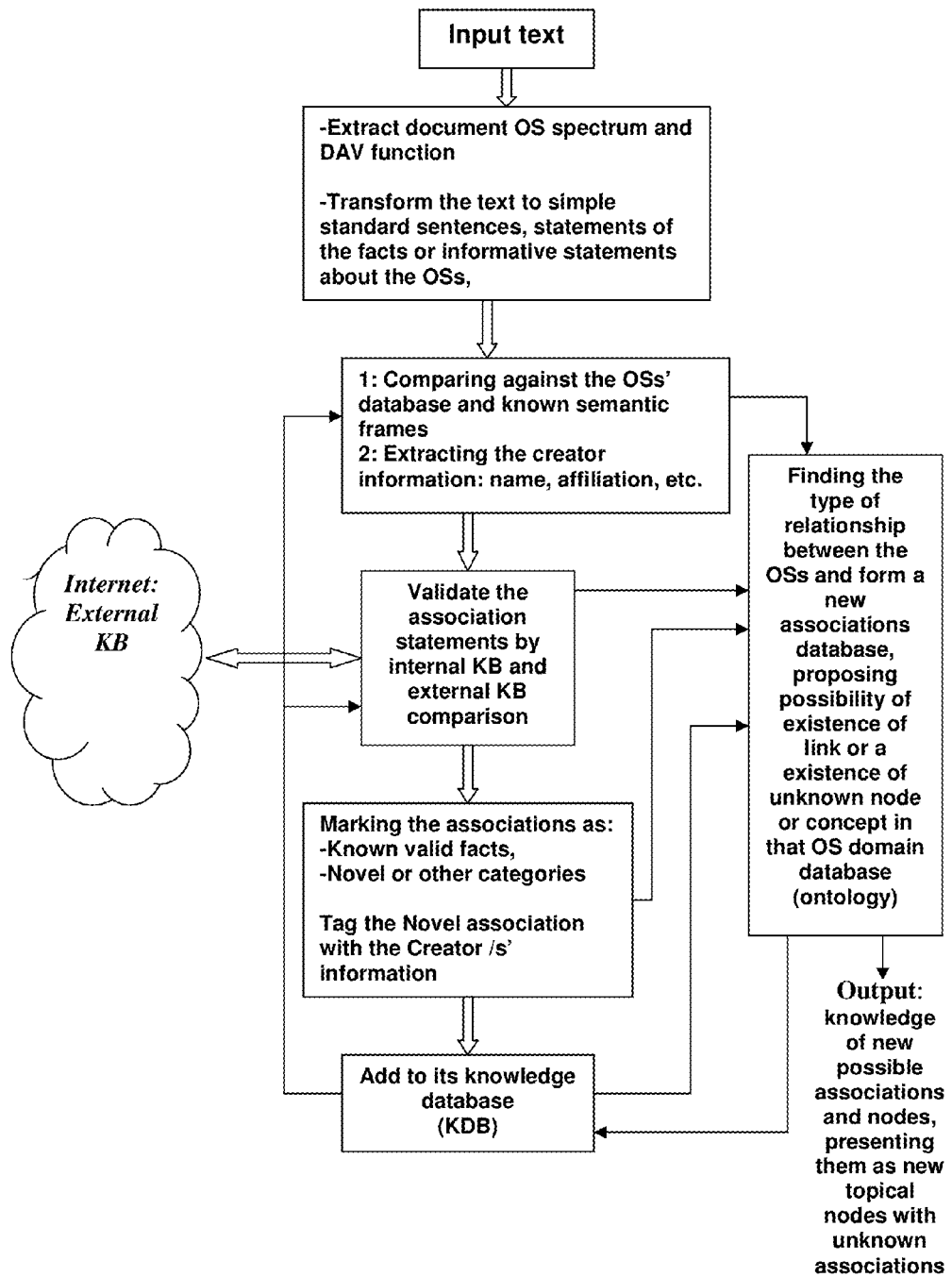
FIG. 12: One exemplary flow diagram of extracting, indexing, and updating the database of association statement/frame and scoring the merit of an input. Shows how OS database is updated and created over the time, associations are updated, new associations are established and new nodes are added as the knowledge base is increased.

FIG. 12, shows one flow diagram of a software agent which proposes existence of new OSs and topics of further research, validates the proposed associative statements of the input content in regards to a subject matter or OS, and updates Knowledge database of the system. The software agent in FIG. 12, further saves the information of the creator of each such novel association or implicit or explicit discoverer of new OSs.

Over the time, new nodes and associations will show their importance by leading to growth of its newly discovered node or other nods, and finding the verified associations that are valuable to other contributors or is of interest to commercial entities and ventures.

The system then is able to rank the importance of a contribution over the time, universally or in each domain, based on an algorithm that quantifies the intrinsic value of the newly found associations or nodes. For instance the values of a contribution over time can be evaluated by a software agent that shows how many other contribution have been build upon one's original contribution, following its submission.

"Furthermore those skilled in the art can store or represent the information of the data objects (e.g. list of ontological subjects. list of subject matters, association spectrums, ontological subject map, ontological subject index, list of authors, and the like and/or the functions and their values, association values, counts, co-occurrences of ontological subjects, vectors or matrix, list or otherwise, and the like etc.) of the present invention in different or equivalent data structures, data arrays or forms without any particular restriction. For example the OSM or co-occurrences of the ontological subjects can be represented by a matrix, sparse matrix, table, database rows, dictionaries and the like which can be stored in various forms of data structures, numerical or otherwise. For instance each layer of the OSM or the ontological subject index, or association value spectrum(s), or knowledge database/s can be represented and/or stored in one or more data structures such as one or more dictionaries, one or more cell arrays, one or more lists or lists in lists, hash tables, tuples, string format, csv format, zip, sequences, sets, counters, or any combined form of data structures, or any other convenient objects of any computer programming languages such as Python, C, Perl, Java., JavaScript etc. Such practical implementation strategies can be devised by various people in different ways. The detailed description, herein, therefore describes one exemplary way of implementing the methods and should not be interpreted as the only way of formulating the concepts, algorithms, and the introducing mathematical or computer implementable objects, measures, parameters, and variables.

It should also be emphasized that each OS is placed in the map uniquely and in the universal context not a domain specific context. Therefore one of the applications and advantages of the system is to show users and creators the rout to navigate and get the direction in their exploration of a subject matter through the OSM. In other words it can be used as searching tool to quickly get the hint as to what are the most important subjects or issues related to their subject matter of interest. In almost most of the cases users do not know what they do not know in relation to a subject matter. Moreover they might not be informed enough to recognize the importance scores of other subjects to their subject mater of interest. Therefore, by using the OSM, the user can prioritize his/her effort and get the direction to navigate his/her exploration in search of finding useful new knowledge.

It should also be noted that the system can and preferably is realized distributedly and need not to operate in a single physical location. Basically each part of the system can be placed anywhere in the world and being connected together by communication means, yet yielding the same function and providing the desired service to its users. Furthermore the system can include data acquisition sensory such as microphones, optical sensors, visual detectors, mechanical or chemical sensors, artificial limbs, and various forms of output devices/forms such as speaker, robotic motions or response, and electronic communication forms such as short messages, emails, machine generated voice or visual and/or various forms of displays etc.

The data/information processing or the computing system that is used to implement the method/s and teachings of the present invention comprises storage devices with more than 1 (one) Giga Byte of RAM capacity and the processing device or units (i.e. data processing or computing devices, e.g. the silicon based microprocessor, quantum computers etc.) that can operate with clock speeds of higher than 1 (one) Giga Hertz or with compound processing speeds of equivalent of one thousand million or larger than one thousand million instructions per second (e.g. an Intel Pentium 3, Dual core, i3, and Xeon series processors or equivalents or similar from other vendors, or equivalent processing power from other processing devices such as quantum computers) are used to perform and execute the method once they have been programmed by computer readable instruction/codes/languages or signals and instructed by the executable instructions to carry out the implementation of the methods and the system. Additionally, for instance according to another embodiment of the invention, the computing or executing system includes wearables or body implantable, or has processing device/s such as graphical processing units for visual computations that are for instance, capable of rendering and demonstrating the graphs/maps of the present invention on a display (e.g. LED displays and TV, projectors, LCD, touch screen mobile and tablets displays, laser projectors wearable or implantable or otherwise, gesture detecting monitors/displays, and the like from various vendors, such as Apple, Samsung, Sony, or the like etc.) with good quality (e.g. using a NVidia graphical processing units). Also the methods, teachings and the application programs of the presents invention can be implement by shared resources such as virtualized machines and servers (e.g. VMware virtual machines, Amazon Elastic Beanstalk, e.g. Amazon EC2 and storages, e.g. Amazon S3, and the like etc. Alternatively specialized processing and storage units (e.g. Application Specific Integrated Circuits ASICs, field programmable gate arrays (FPGAs) and the like) can be made and used in the computing system to enhance the performance and the speed and security of the computing system of performing the methods and application of the present invention.

Moreover several of such computing systems can be run under a cluster, network, cloud, mesh or grid configuration connected to each other by communication ports and data transfers apparatuses such as switches, data servers, load balancers, gateways, modems, internet ports, databases servers, graphical processing units, storage area networks (SANs) and the like etc. The data communication network to implement the system and method of the present invention carries, transmit, receive, or transport data at the rate of 10 million bits or larger than 10 million bits per second;

Furthermore the terms "storage device, "storage", "memory", and "computer-readable storage medium/media" refers to all types of non-transitory computer readable media such as magnetic cassettes, flash memories cards, digital video discs, random access memories (RAMSs), Bernoulli cartridges, optical memories, read only memories (ROMs), Solid state discs, data processing devices and units wearable or otherwise, and the like, with the sole exception being a transitory propagating signal.

The system can sustain its service by several methods of generating revenue and profit. Paid subscriber to each or a number of shops, selling copies of contents, advertisement and all the known methods of electronic commerce revenue sources, may generate revenue for each shop and the system. Moreover, the system can be mandated from an entity to make an effort to find a solution to a challenging problem that is important for that entity. The system then splits the proceeds to all the contributing parties according to a predefined contract.

Additionally, fresh and timely contributions can be sold online to other researchers interested in that research content to keep them update. There could be enough interest from peer researches to get the result. The price of content download can be decreased over time in a certain fashion and of course the contributor/s can get a reward and share the profit from the sale of their contribution. The revenue generation model can be from targeted advertising fee as well. Since the shops become specialized the advertisement in each shop are more relevant to the reader of each publications/broadcasting shop in general and the revenue from target ads from each shop will be shared by the owner of the shop and the publishing host. Each shop can arrange its own real or virtual face-to-face meeting and organize conferences, etc. or have gatherings and organize events.

The success of the system commercially is mostly based on the substance of the contents published or broadcasted and the value of its service to the users. Therefore the system, in one aspect of this invention, will share the success to its contributors. Over the time, depend on the success of a content in terms of its popularity and importance, a creator accumulates credit points and at some point they can claim their credits in some form of monetary compensation, rewards, prizes, profit sharing, ownership or the like allowable by laws. There is provided a method to quantify the importance of one's contribution to the art. For instance, the more a submitted content generates further ontological subjects and grows its node, the higher the rank of importance and contribution of the content will be. Also ranking algorithm of linked databases, such as the page-rank, can be applied to evaluate the importance and impact of the content over the time.

Considering that each shop's title is also a node in the Ontological Subjects database, it is also possible to evaluate the overall rank and importance of the shops in a similar fashion. The success of a shop is measured by both its popularity and importance of its subject and impact as well as the revenue that a shop or the owner of the shop has generated. The system allows shop owners, with or without the help of system, to generate income by, for example, displaying other entities advertisement, banner, or any other means appropriate and accepted by law. The system again is benefited from such income based on the predefined agreements with each shop owner.

The system can have its own rules or protocols to ensure its profitability and its competitiveness. For instance, while many of the shops are identified and set up and establish by the system there is provided an opportunity for qualified users to establish their own shops through the system as well. There could be of course parallel and competing online shop but they will be given a certain time to produce enough interest in their own shops by writing or soliciting content from other so that they can produce enough interest and online traffic to keep their shops open. Failing to do so the system can stop giving them service or put them in the lower rank or lower tier shop. It is possible for a demoted shop administrator to upgrade to higher tier over time by producing higher quality contents. The contributors that have made significant and valuable contribution may have the privilege and advantages on establishing their own shops.

In conclusion the disclosed system and method will help to accelerate the rate of knowledge discovery for everyone's benefit, by providing the subject matters of intrinsic value for exploration, tools for knowledge navigation and content evaluation, rapid circulation and communication, and providing incentive for all the contributors such as content creators, editors, shop owners, and administrators. The system and method thus can help to improve the quality of life and increase economic growth and prosperity.

It is understood that the preferred or exemplary embodiments and examples described herein are given to illustrate the principles of the invention and should not be construed as limiting its scope. Various modifications to the specific embodiments could be introduced by those skilled in the art without departing from the scope and spirit of the invention as set forth in the following claims.

What is claimed is:

1. A system for generating and storing a multilayer ontological subject index into one or more data structures for knowledge retrieval comprising:
one or more data processing or computing units, said one or more data processing or computing units having compound processing speeds of one thousand million or larger than one thousand million instructions per second and a collective memory of larger than predetermined storage capacity configured to:
providing a plurality of ontological subjects,
providing access to a collection of electronic content by way of electronic communication through a data communication network, said data communication network carries, transmits, or transports data at the rate of 10 million bits per second or larger than 10 million bits per second,
evaluating numerically, using said one or more processing or computing units, association values between a number of pairs of ontological subjects, using data information of co-occurrence of each of said pairs, within predefined proximities in the collection of electronic content;
selecting a first set of ontological subjects, and building an association set for a member of said first set, wherein the association set corresponds to one or more ontological subjects having association values higher than a predefined value with said member of the first set,
indexing the members of the first set and members of said associated set in a multilayer index of ontological subjects, wherein each layer is assigned with an index frame indicating the layer and association of the ontological subjects; and
building one or more data structures corresponding to said multilayer index of ontological subjects and storing said one or more data structures into one or more non transitory computer readable storage devices; and
querying the ontological subject index to retrieve ontological subjects having association values of larger than a predefined value.

2. The system of claim 1 wherein at least one member of at least one associated set is tagged as dormant.

3. The system of claim 1 wherein the association value between a pair of ontological subjects is further weighted with a function of frequency of occurrences of at least one of the ontological subjects of the pair in said collection of content.

4. The system of claim 1, wherein the at least one collection of electronic content includes content retrieved from a search engine database.

5. The system of claim 1, wherein said association value of the pair of ontological subject is evaluated using the count information by querying at least one Internet search engine and getting the co-occurrence count of the pair from the search engine.

6. The system of claim 2, wherein the ontological subject index is represented with a corresponding ontological subject map, wherein each indexed ontological subject is represented by a node in the map, wherein the map is configured to show an ontological subject of an association set as growing or dormant, whereby providing a tool for visual navigation and focusing on a desired particular place of the map.

7. The system of claim 1, wherein the associated set of an ontological subject is represented by at least one form of spectral graph data having ontological subjects in one axis and showing the association value of the members of the set in another axis.

8. The system of claim 1, further configured to identify at least one of the followings:
related subjects,
most import subjects related to another subject,
indirect relation of two or more subjects.

9. The system of claim 1, further configured to provide one or more routes for exploration of ontological subjects of the collection of content.

10. The system of claim 1, further configured to find explicit form of relations of association between one or more number of ontological subjects of the at least one collection of content; and recording and storing said explicit forms of relations in a database configured for retrieval.

11. The system of claim 1, further configured to score a merit value for an electronic content in terms of validity, or novelty utilizing data stored in said one or more data structures of the oncological subject index.

* * * * *